(12) United States Patent
Cazier et al.

(10) Patent No.: US 7,920,167 B2
(45) Date of Patent: Apr. 5, 2011

(54) METHOD AND APPARATUS FOR THE CREATION OF IMAGE CAPTURE DEVICE PARAMETER CURVES

(75) Inventors: Robert P. Cazier, Fort Collins, CO (US); Murray D. Craig, Johnstown, CO (US); Benjamin D. Kimbell, Fort Collins, CO (US)

(73) Assignee: Hewlett-Packard Development Company, L.P., Houston, TX (US)

( * ) Notice: Subject to any disclaimer, the term of this patent is extended or adjusted under 35 U.S.C. 154(b) by 1298 days.

(21) Appl. No.: 11/119,191

(22) Filed: Apr. 29, 2005

(65) Prior Publication Data

US 2006/0244834 A1 Nov. 2, 2006

(51) Int. Cl.
*H04N 5/225* (2006.01)
*H04N 5/262* (2006.01)
*H04N 5/222* (2006.01)

(52) U.S. Cl. .......... 348/207.99; 348/240.99; 348/333.01

(58) Field of Classification Search .................. 348/135, 348/180, 188, 207.99, 240.99, 333.01–333.13; 382/190, 276; 396/213, 223.4, 100; 358/468; 379/100

See application file for complete search history.

(56) References Cited

U.S. PATENT DOCUMENTS

| | | | |
|---|---|---|---|
| 5,218,445 A * | 6/1993 | van Roessel | 348/349 |
| 5,457,370 A * | 10/1995 | Edwards | 318/571 |
| 5,815,645 A | 9/1998 | Fredlund | |
| 6,011,536 A | 1/2000 | Hertzmann | |
| 6,101,293 A | 8/2000 | McKenzie | |
| 6,154,577 A | 11/2000 | Warnick | |
| 6,285,468 B1 | 9/2001 | Cok | |
| 6,317,192 B1 | 11/2001 | Silverbrook | |
| 6,570,623 B1 * | 5/2003 | Li et al. | 348/383 |
| 6,573,932 B1 * | 6/2003 | Adams et al. | 348/224.1 |
| 6,665,015 B1 * | 12/2003 | Watanabe et al. | 348/362 |
| 6,671,387 B1 | 12/2003 | Chen | |
| 6,724,913 B1 | 4/2004 | Chen | |
| 6,775,407 B1 | 8/2004 | Gindele | |
| 6,795,585 B1 | 9/2004 | Parada | |
| 7,391,462 B2 * | 6/2008 | Ike | 348/347 |
| 7,545,996 B2 * | 6/2009 | Cazier et al. | 382/276 |
| 2002/0012398 A1 * | 1/2002 | Zhou et al. | 375/240.25 |
| 2004/0258308 A1 | 12/2004 | Sadovsky | |
| 2004/0263640 A1 | 12/2004 | Silverbrook | |
| 2005/0162542 A1 * | 7/2005 | Nakayama | 348/362 |

* cited by examiner

*Primary Examiner* — Nhan T Tran
*Assistant Examiner* — Tuan H Le

(57) ABSTRACT

A user provides a graphical representation of a desired image capture device control parameter curve with respect to time. A digital image of the graphical representation of a desired image capture device control parameter curve is captured. The digital image is analyzed by a processor that generates necessary control parameters as defined by the desired image capture device control parameter curve. The processor uses the resulting control parameters to control an image capture device during an image capture session.

30 Claims, 5 Drawing Sheets

METHOD AND APPARATUS FOR THE CREATION OF IMAGE CAPTURE DEVICE PARAMETER CURVES

CROSS-REFERENCE TO RELATED APPLICATION

This application is related to application Ser. No. 11/119,016 entitled, "Method and Apparatus for the Creation of Image Post-Processing Parameter Curves," filed on the same date as the present application, and hereby incorporated herein by reference. application Ser. No. 11/119,016 discloses and claims a method for the automatic generation of image post-processing parameter curves.

FIELD OF THE INVENTION

The present invention relates generally to the field of image capture, and more particularly to the field of accurate and easy curve generation for the control of image capture devices.

BACKGROUND OF THE INVENTION

In the field of image capture devices, particular in digital video cameras, a user often will desire to vary a parameter of the device with respect to time during an image capture session. For example, a user may wish to vary the zoom parameter of the lens of a digital video camera during image capture. Currently, the user must manually control the zoom parameter, typically through the use of one or more control buttons on the image capture device. Since this is done manually, the possibility of a smooth zoom is reduced. Also, the user is typically limited to zoom at a single rate of zoom. Experienced users may wish to control the zoom parameter with respect to time much more closely than is currently allowed by most image capture devices.

Zoom is but one image capture device parameter that may be varied throughout an image capture session. For example, more complicated image capture devices may include the capability of panning the device either by horizontal (or vertical) motion or by rotation. Many users are physically incapable of smoothly and accurately panning an image capture device. Other image capture device parameters may include time-lapse image capture, video editing (such as fades and wipes), and audio capture.

SUMMARY OF THE INVENTION

A user provides a graphical representation of a desired image capture device control parameter curve with respect to time. A digital image of the graphical representation of a desired image capture device control parameter curve is captured. The digital image is analyzed by a processor that generates necessary control parameters as defined by the desired image capture device control parameter curve. The processor uses the resulting control parameters to control an image capture device during an image capture session.

Other aspects and advantages of the present invention will become apparent from the following detailed description, taken in conjunction with the accompanying drawings, illustrating by way of example the principles of the invention.

DETAILED DESCRIPTION

Figure 1:
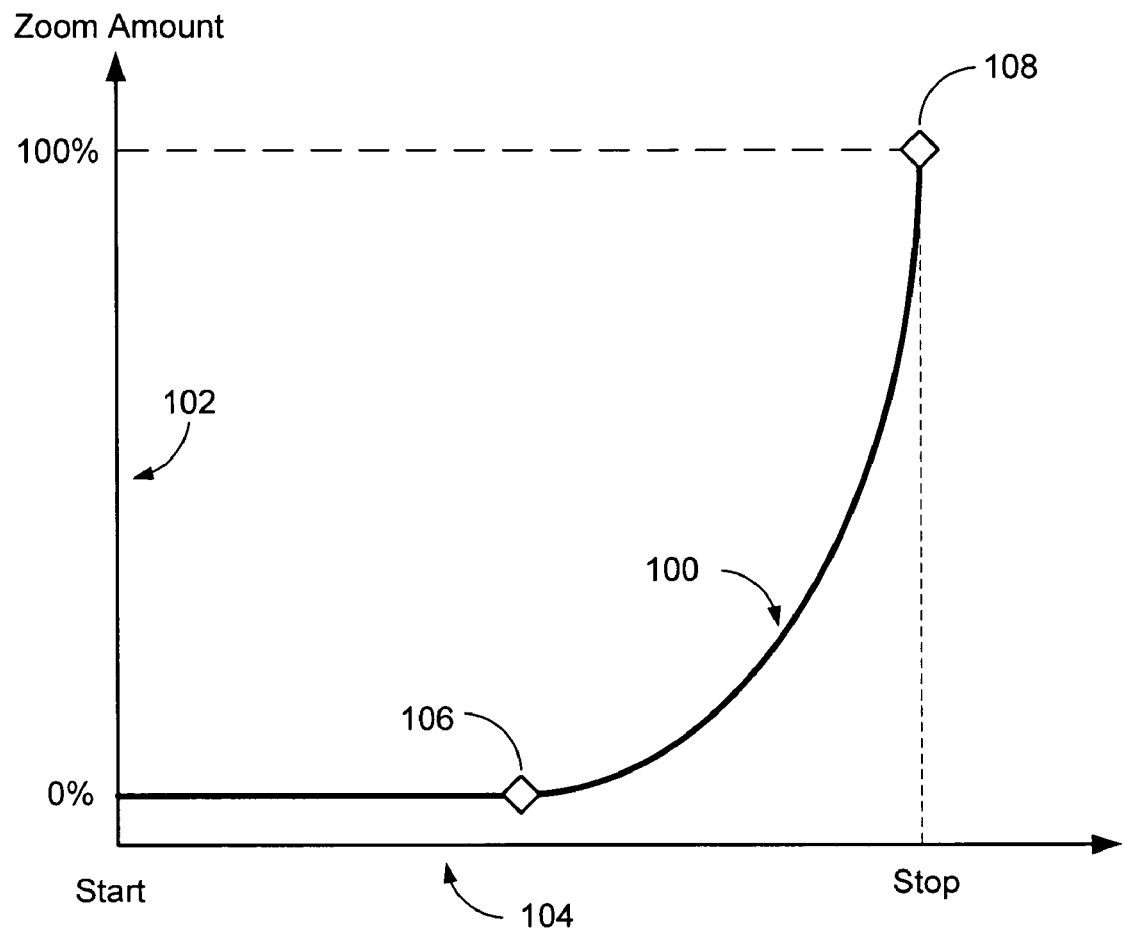
FIG. 1 is an example of a desired zoom amount curve used to control the zoom of an image capture device during an image capture session according to an example embodiment to the present invention.

This description of the preferred embodiments is intended to be read in connection with the accompanying drawings, which are to be considered part of the entire written description of this invention. In the description, relative terms such as "lower," "upper," "horizontal," "vertical," "up," "down," "top," "bottom," "left," and "right" as well as derivatives thereof (e.g., "horizontally," "downwardly," "upwardly," etc.) should be construed to refer to the orientation as then described or as shown in the drawing figure under discussion. These relative terms are for convenience of description and normally are not intended to require a particular orientation. Terms concerning attachments, coupling and the like, such as "connected," "coupled," and "interconnected," refer to a relationship wherein structures are secured or attached to one another either directly or indirectly through intervening structures, as well as both movable or rigid attachments or relationships, unless expressly described otherwise.

The word "curve" as used in this description of the present invention includes any single parameter function. For example, in some embodiments of the present invention, the "curve" may be a straight line. In other embodiments of the present invention, the "curve" may not be contiguous, but include sudden step functions. Those of skill in the art will recognize that any function where each possible value of a first parameter results in a single value of a second parameter may be described as a "curve" within the scope of the present invention.

FIG. 1 is an example zoom amount curve used to control the zoom of an image capture device during an image capture session according to an example embodiment to the present invention. In this example image capture device control parameter curve 100, the x-axis 104, represents time within the image capture session, and the y-axis 102, represents the corresponding amount of zoom desired to be applied to the image at any given position within the image. Note that in this example embodiment zoom is at 0% from the beginning of the image capture session until a point 106 where the zoom amount starts to climb until reaching 100% zoom at a point 108 at the end of the image capture session. A processor will generate a function relating to the amount of zoom used with respect to time within the image capture session. This function is defined by one or more image capture device control function parameters. In some cases this control function may be linear, in others exponential, and in still others there may be a linear region leading into an exponential region such as in the example zoom amount curve of FIG. 1. Those of skill in the art will recognize that each value of x (time) translates to a single value of y when this parameter function is applied.

As used within this description, "image capture device control function parameters" are those mathematical parameters used to describe the function generated from the desired image capture device control parameter curve. For example a linear "curve" may be represented by a function of the form $y=f(x)=mx+b$, where m is the slope of the line and b is the point where the line crosses the y-axis. Thus, parameters m and b are the "image capture device control function parameters" for this particular "curve." Those of skill in the art will recognize that many more complex functions with their corresponding "image capture device control function parameters" may be used within the scope of the present invention.

Those of skill in the art will recognize that while this example embodiment of the present invention concerns a zoom amount control parameter, many other control parameter curves may be captured using the method of the present invention. For example, curves related to time-lapse image capture, video editing (such as fades and wipes), audio capture, and many other control parameters may be captured using the method of the present invention.

Figure 2:
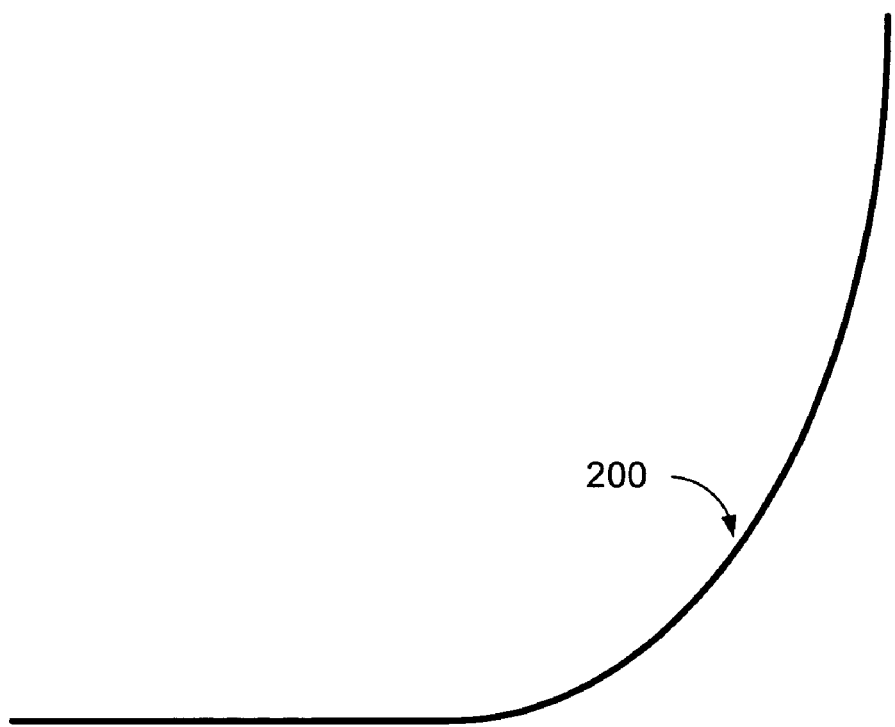
FIG. 2 is an example of how a user may draw the desired zoom amount curve of FIG. 1.

FIG. 2 is an example of how a user may draw the desired zoom amount curve of FIG. 1. In this case the user has drawn a simple curve 200 representing the desired zoom amount image capture device control parameter. Notice that the user did not provide any axis for the curve.

Figure 3A:
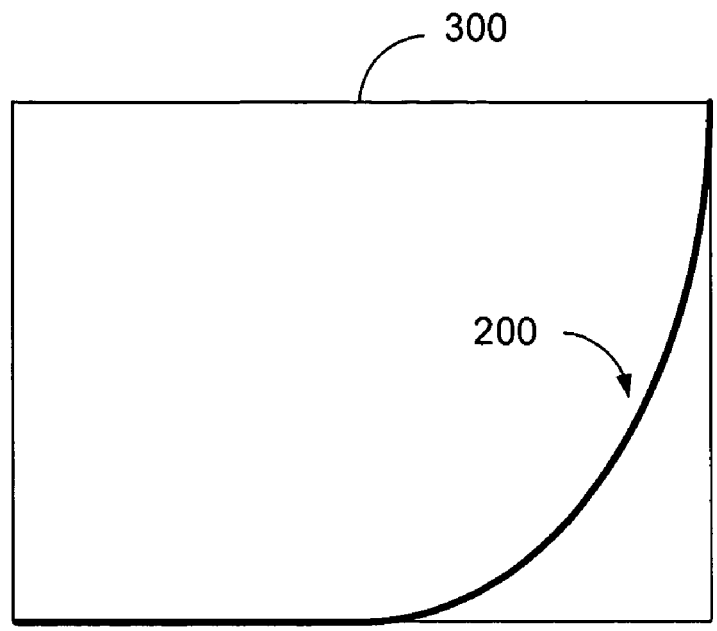
FIG. 3A is a representation of the view through the viewfinder of an image capture device configured to capture the user drawn zoom curve of FIG. 2 according to an example embodiment of the present invention.

FIG. 3A is a representation of the optical viewfinder or viewfinder display of an image capture device configured to capture the user drawn zoom amount curve of FIG. 2 according to an example embodiment of the present invention. In this example embodiment of the present invention, the entire optical viewfinder or viewfinder display 300 is used to delineate the bounds of the desired image post-processing curve. The bottom edge of the optical viewfinder or viewfinder display 300 acts as the x-axis (time) and minimum y (zoom amount) value. The left edge of the optical viewfinder or viewfinder display 300 acts as the y-axis (zoom amount) and the start of the image capture session. The upper edge of the optical viewfinder or viewfinder display 300 acts as the maximum y (zoom amount) value. The right edge of the optical viewfinder or viewfinder display 300 acts as the end of the image capture session.

Those of skill in the art will recognize that while some image capture devices include optical viewfinders, other image capture devices may use, for example, an LCD viewfinder display in place of a viewfinder or in addition to an optical viewfinder, and that either or both may be used within the scope of the present invention.

Figure 3B:
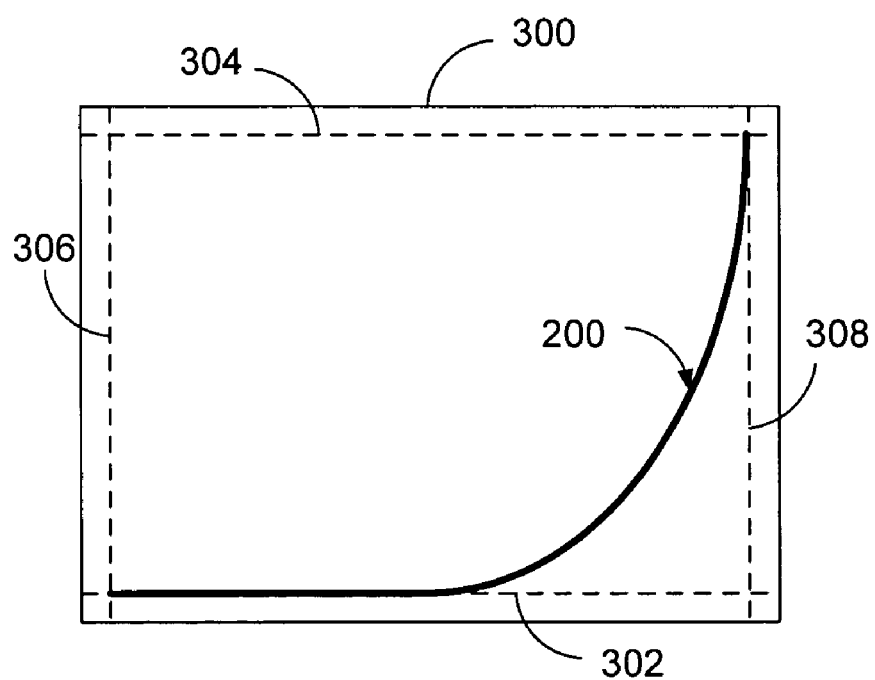
FIG. 3B is another representation of the view through the viewfinder of an image capture device configured to capture the user drawn zoom curve of FIG. 2 according to an example embodiment of the present invention.

FIG. 3B is another representation of the optical viewfinder or viewfinder display of an image capture device configured to capture the user drawn zoom amount curve of FIG. 2 according to an example embodiment of the present invention. In this example embodiment of the present invention visual elements are shown within the optical viewfinder or viewfinder display 300 which delineate the bounds used in capturing the desired image capture device control parameter curve. Less than all of the optical viewfinder or viewfinder display 300 is used to capture the desired image capture device control parameter curve. In this example embodiment of the present invention, dashed lines are used as the visual elements delineating the bounds of the image capture device control parameter curve. However, those of skill in the art will recognize that a wide variety of other visual elements may be used to delineate the bounds of the image capture device control parameter curve within the scope of the present invention. In this example embodiment of the present invention, a lower dashed line 302 is used to represent the x-axis (time) and minimum y (zoom amount) value of the image capture device control parameter curve, and an upper dashed line 304 is used to delineate the maximum y (zoom amount) value. A left dashed line 306 is used to represent the y-axis (zoom amount) and the start of the image capture session, and a right dashed line 308 is used to delineate the end of the image capture session.

Those of skill in the art will recognize that once users have captured a first digital image of a particular desired image capture device control parameter curve, these first digital images may be stored for later use during a plurality of image capture session. Thus, the user need capture a control parameter curve only once, and may use that control parameter curve later on a wide variety of image capture device, during a plurality of image capture sessions. Also, users may build up a library of first digital images of control parameter curves for later use, or for sharing with others.

Figure 4:
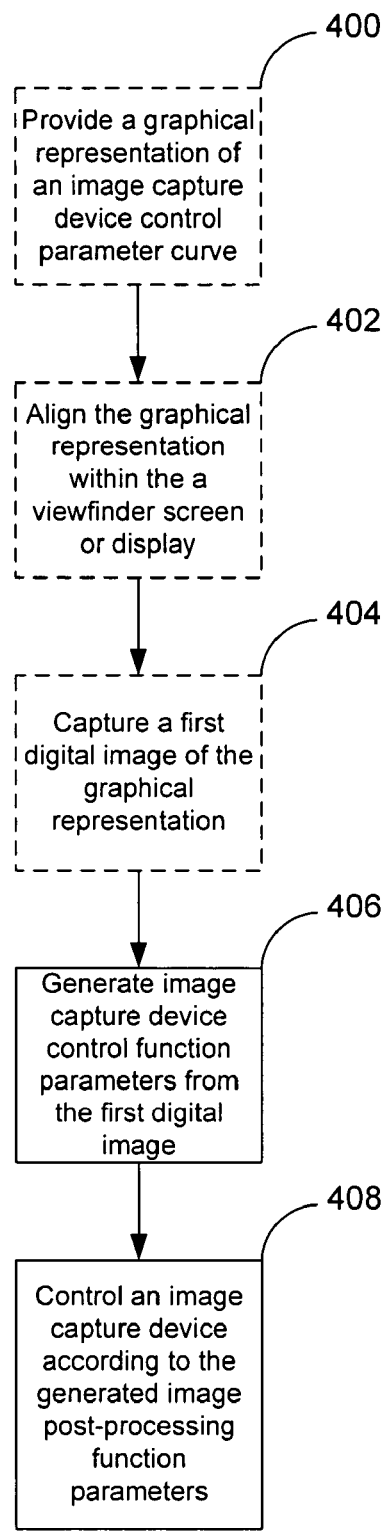
FIG. 4 is a flow chart of a method of generating image capture device control parameters according an example embodiment to the present invention.

FIG. 4 is a flow chart of a method of generating image capture device control parameters according an example embodiment to the present invention. In an optional step 400, a graphical representation of an image capture device control parameter curve is provided. In an optional step 402, the graphical representation is aligned within an optical viewfinder or viewfinder display. In an optional step 404, a first digital image is captured of the graphical representation of an image capture device control parameter curve. In a step 406, the first digital image is used to generate image capture device control function parameters. In a step 408, the image capture device control function parameters are used to control an image capture device. Those of skill in the art will recognize that a wide variety of methods may be used to generate image capture device control function parameters from the first digital image within the scope of the present invention. For example, an example embodiment of the present invention may first apply a color threshold to the first digital image, trace the curve from left to right, analyze any gaps to make a smooth single curve, quantize and subsample the curve to create a curve applicable to the entire image, duplicate the curve as necessary to apply symmetry, all before generating the function parameters for the application of the control parameter.

Figure 5A:
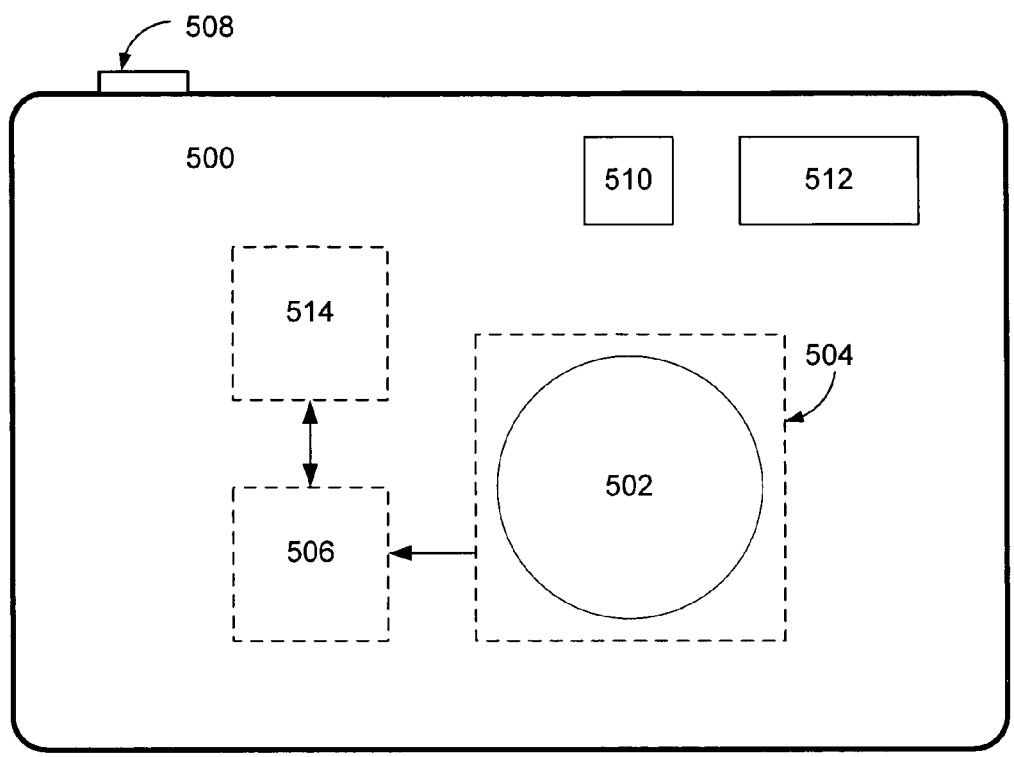
FIG. 5A is a front view of an example embodiment of a device for generating image capture device control function parameters according to the present invention.

FIG. 5A is a front view of an example embodiment of a device for generating image capture device control function parameters according to the present invention. In this example embodiment of the present invention, a digital video camera 500, including a lens 502, an image sensor 504, such as a CCD or CMOS sensor, a memory 506, a shutter button 508, an optical viewfinder 510, and a strobe 512, is configured to generate image capture device control function parameters. This digital camera 500 also includes a processor 514, electrically coupled with the memory 506, configured to generate image capture device control function parameters from a first digital image of an image capture device control parameter curve, and to apply the image post-processing function parameters to control the image capture device. Those of skill in the art will recognize that a digital video camera 500 is but one of a variety of devices that may be configured to generate image capture device control function parameters from a first digital image of an image capture device control parameter curve, and to use the control function parameters to control an image capture device, within the scope of the present invention. For example, a computer may be used as an embodiment of the present invention where the first digital image is captured by a separate image capture device and provided to the computer processor for generation of the control function parameters and application of the control function parameters to an external image capture device.

Figure 5B:
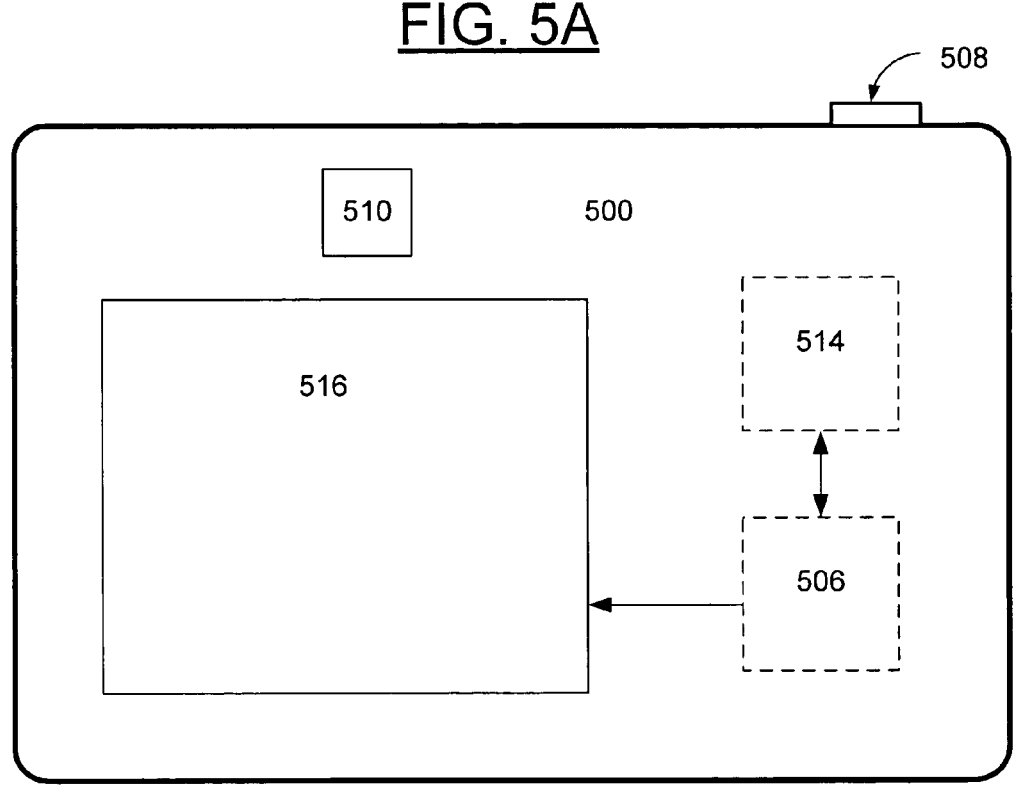
FIG. 5B is a rear view of an example embodiment of a device for generating image capture device control function parameters according to the present invention.

FIG. 5B is a rear view of an example embodiment of a device for generating image capture device control function parameters according to the present invention. In this example embodiment of the present invention, the digital video camera 500, also includes a viewfinder display 516, such as an LCD display used to show viewfinder, and other information.

The foregoing description of the present invention has been presented for purposes of illustration and description. It is not intended to be exhaustive or to limit the invention to the precise form disclosed, and other modifications and variations may be possible in light of the above teachings. The embodiments were chosen and described in order to best explain the principles of the invention and its practical application to thereby enable others skilled in the art to best utilize the invention in various embodiments and various modifications as are suited to the particular use contemplated. It is intended that the appended claims be construed to include other alternative embodiments of the invention except insofar as limited by the prior art.

What is claimed is:

1. A method comprising the steps of:
providing a digital image of a graphical representation of an image capture device control parameter curve to a processor, the graphical representation having a first axis representing the image capture device control parameter, and the graphical representation having a second axis representing time, the image capture device control parameter curve defining changes to image capture device control parameters with respect to the first axis, as a function of time on the second axis during image capture;
the processor generating the image capture device control parameters from the digital image captured by an image capture device; and
the processor controlling the image capture device with the image capture device control parameters during an image capture session.

2. The method of claim 1 wherein the image capture device control parameter curve is user-drawn captured by the image capture device.

3. The method of claim 2 wherein the user-drawn curve has no user-provided axis.

4. The method of claim 1 wherein an optical viewfinder display of the image capture device acts as the x-axis and y-axis.

5. The method of claim 1 wherein the image capture device control parameter curve is a user-drawn curve showing desired zoom amount.

6. The method of claim 1 wherein the image capture device control parameter curve is user-drawn.

7. A method comprising the steps of:
providing a graphical representation of an image capture device control parameter curve, the graphical representation having a first axis for the image capture device control parameter, the graphical representation having a second axis for time, the image capture device control parameter curve defining changes to image capture device control function parameters with respect to time during image capture, wherein the changes are shown in the graphical representation by a moving graphic on the image capture device control parameter curve;
capturing a first digital image of the provided image capture device control parameter curve using an image capture device;
a processor generating the image capture device control function parameters from the first digital image; and
the processor controlling the image capture device according to the generated image capture device control function parameters.

8. A method as recited in claim 7, further comprising the step of:
aligning the graphical representation of the image capture device control parameter curve within an optical viewfinder before capturing the first digital image.

9. A method as recited in claim 8,
wherein the entirety of the optical viewfinder is configured to delineate bounds of the image capture device control parameter curve.

10. A method as recited in claim 8,
wherein less than all of the optical viewfinder is configured to delineate hounds of the image capture device control parameter curve.

11. A method as recited in claim 10,
wherein said optical viewfinder is configured to display visual elements delineating the bounds of the image capture device control parameter curve.

12. A method as recited in claim 7, further comprising the step of:
aligning the graphical representation of the image capture device control parameter curve on a viewfinder display before capturing the first digital image.

13. A method as recited in claim 12,
wherein the entirety of the viewfinder display is configured to delineate bounds of the image capture device control parameter curve.

14. A method as recited in claim 12,
wherein less than all of the viewfinder display is configured to delineate bounds of the image capture device control parameter curve.

15. A method as recited in claim 14,
wherein said viewfinder display is configured to display visual elements delineating the bounds of the image capture device control parameter curve.

16. A device comprising:
a memory containing a first digital image of a graphical representation of an image capture device control parameter curve, the graphical representation having a first axis for the image capture device control parameter, the graphical representation having a second axis for time, the image capture device control parameter curve defining changes to image capture device control function parameters with respect to time during image capture; and
a processor electrically coupled with said memory, configured to generate the image capture device control function parameters with respect to time from the first digital image captured by an image capture device, and control the image capture device according to the generated image capture device control function parameters.

17. The device recited in claim 16, further comprising:
an image sensor, electrically coupled with said memory;
a lens configured to project an image on said image sensor; and
an optical viewfinder, configured to display an image similar to that projected on said image sensor.

18. The device recited in claim 17,
wherein said device is configured to capture a first digital image of a graphical representation of an image capture device control parameter curve and store the first digital image in said memory.

19. The device recited in claim 18,
wherein, said optical viewfinder is configured to allow a user to align the graphical representation of an image capture device control parameter curve within said optical viewfinder before capturing the first digital image.

20. The device recited in claim 19,
wherein the entirety of said optical viewfinder is configured to delineate bounds of the image capture device control parameter curve.

21. The device recited in claim 19,
wherein less than all of said optical viewfinder is configured to delineate bounds of the image capture device control parameter curve.

22. The device recited in claim 21,
wherein said optical viewfinder is configured to display visual elements delineating the bounds of the image capture device control parameter curve.

23. The device recited in claim 16, further comprising:
an image sensor, electrically coupled with said memory;
a lens configured to project an image on said image sensor; and
a viewfinder display, configured to display an image similar to that projected on said image sensor.

24. The device recited in claim 23,
wherein said device is configured to capture a first digital image of a graphical representation of an image capture device control parameter curve and store the first digital image in said memory.

25. The device recited in claim 24,
wherein, said viewfinder display is configured to allow a user to align the graphical representation of an image capture device control parameter curve within said viewfinder display before capturing the first digital image.

26. The device recited in claim 25,
wherein the entirety of said viewfinder display is configured to delineate bounds of the image capture device control parameter curve.

27. The device recited in claim 25,
wherein less than all of said viewfinder display is configured to delineate bounds of the image capture device control parameter curve.

28. The device recited in claim 27,
wherein said viewfinder display is configured to display visual elements delineating the bounds of the image capture device control parameter curve.

29. A device comprising:
means for storing a first digital image of a graphical representation of an image capture device control parameter curve, the graphical representation having a first axis for the image capture device control parameter, the graphical representation having a second axis for time, the image capture device control parameter curve defining changes to image capture device control function parameters with respect to time during image capture;
means for generating the image capture device control function parameters with respect to time from the first digital image captured by an image capture device; and
means for controlling the image capture device according to the generated image capture device control function parameters.

30. The device recited in claim 29, further comprising:
means for capturing a digital image; and
means for displaying an image similar to that projected on said image sensor.

* * * * *

UNITED STATES PATENT AND TRADEMARK OFFICE
CERTIFICATE OF CORRECTION

PATENT NO.         : 7,920,167 B2
APPLICATION NO.    : 11/119191
DATED              : April 5, 2011
INVENTOR(S)        : Robert P. Cazier et al.

It is certified that error appears in the above-identified patent and that said Letters Patent is hereby corrected as shown below:

In column 6, line 18, in Claim 10, delete "hounds" and insert -- bounds --, therefor.

Signed and Sealed this
Eighth Day of November, 2011

David J. Kappos
*Director of the United States Patent and Trademark Office*